US011897115B2

(12) United States Patent
Cate et al.

(10) Patent No.: US 11,897,115 B2
(45) Date of Patent: Feb. 13, 2024

(54) ERGONOMIC GRIP FOR STRIKING TOOL

(71) Applicant: Stanley Black & Decker, Inc., New Britain, CT (US)

(72) Inventors: Christopher Allen Vogado Cate, Hamden, CT (US); Robert Ian Stein, West Hartford, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

(21) Appl. No.: 18/129,183

(22) Filed: Mar. 31, 2023

(65) Prior Publication Data

US 2023/0234208 A1 Jul. 27, 2023

Related U.S. Application Data

(63) Continuation of application No. 17/116,376, filed on Dec. 9, 2020, now Pat. No. 11,660,738.

(51) Int. Cl.
*B25G 1/10* (2006.01)

(52) U.S. Cl.
CPC .................................... *B25G 1/102* (2013.01)

(58) Field of Classification Search
CPC ...................................................... B25G 1/102
See application file for complete search history.

(56) References Cited

U.S. PATENT DOCUMENTS 2,871,899 A * 2/1959 Coyle ..................... B25B 23/16 81/177.1
4,660,832 A 4/1987 Shomo
4,964,192 A * 10/1990 Marui .................... B62K 21/26 473/203
5,530,989 A * 7/1996 Remmert ............... B25G 1/105 16/DIG. 12
5,588,343 A 12/1996 Rust et al.
5,740,586 A 4/1998 Gomas
5,926,911 A 7/1999 Chen
6,065,188 A * 5/2000 Wold ...................... A47J 45/06 16/436
6,202,511 B1 3/2001 Murray et al.
6,311,369 B1 11/2001 Ryu
(Continued)

FOREIGN PATENT DOCUMENTS

DE 19732421 C2 5/2001
DE 10113368 A1 10/2001
(Continued)

*Primary Examiner* — Jason W San
(74) *Attorney, Agent, or Firm* — Gabriel A. Haboubi

(57) ABSTRACT

A striking hand tool includes a grip component where an external surface has a front arc half and a rear arc half, wherein an area of the grip is smaller in a first cross sectional plane further from a head of the tool than a second plane closer to the head portion. A ρ value of the front arc half in the first cross sectional plane is less than approximately 0.45. A measurement from a first axis to a frontmost point in the first cross sectional plane is between 17.5 mm and 19 mm. A ρ value of the front arc half in the second cross sectional plane is less than approximately 0.5. A measurement from the first axis to a frontmost point in the second cross sectional plane is between 18.5 mm and 20 mm. Methods of manufacturing and striking hand tools having desirous durometer measurements are also disclosed.

12 Claims, 7 Drawing Sheets

(56) References Cited

U.S. PATENT DOCUMENTS

| | | | | | |
|---|---|---|---|---|---|
| 6,370,986 | B1 | 4/2002 | Scott | | |
| 6,554,515 | B2 * | 4/2003 | Debbas | B43K 21/006 | 16/430 |
| 6,619,408 | B1 | 9/2003 | Lai | | |
| 6,763,747 | B1 | 7/2004 | Gierer et al. | | |
| 6,889,405 | B2 | 5/2005 | Ritrovato et al. | | |
| 7,066,052 | B2 | 6/2006 | Chen | | |
| 7,877,843 | B2 * | 2/2011 | Holland-Letz | B25G 1/105 | 16/436 |
| 8,499,665 | B2 | 8/2013 | St. John et al. | | |
| 8,549,691 | B2 * | 10/2013 | Moskovich | A46B 5/026 | 16/DIG. 18 |
| 8,814,719 | B2 | 8/2014 | Wall, Jr. | | |
| 8,844,904 | B2 * | 9/2014 | Bogh-Sorensen | A61G 7/1073 | 254/133 R |
| 9,168,648 | B2 | 10/2015 | Lombardi et al. | | |
| 10,464,198 | B1 * | 11/2019 | Steidtmann | B25G 3/30 | |
| 10,583,550 | B2 | 3/2020 | Lombardi et al. | | |
| D897,805 | S * | 10/2020 | Cate | D8/80 | |
| 2002/0029664 | A1 | 3/2002 | Murray | | |
| 2002/0124353 | A1 | 9/2002 | Holland-Letz | | |
| 2004/0058759 | A1 | 3/2004 | Falone et al. | | |
| 2004/0224786 | A1 | 11/2004 | Reardon | | |
| 2008/0163463 | A1 * | 7/2008 | Hulden | B25G 1/105 | 16/430 |
| 2008/0176670 | A1 | 7/2008 | Gill et al. | | |
| 2008/0263829 | A1 | 10/2008 | Diasio | | |
| 2008/0302214 | A1 * | 12/2008 | Hoffman | B25D 1/045 | 81/22 |
| 2009/0271951 | A1 * | 11/2009 | Hao | B25G 1/102 | 81/427.5 |
| 2010/0275416 | A1 * | 11/2010 | Fox | A46B 5/02 | 16/430 |
| 2011/0094062 | A1 * | 4/2011 | Pasquini | A47J 45/071 | 16/430 |
| 2012/0222525 | A1 | 9/2012 | Qiu | | |
| 2014/0103276 | A1 * | 4/2014 | Fegan | B25G 1/102 | 254/26 R |
| 2014/0173853 | A1 * | 6/2014 | Kirchhofer | B29C 45/14336 | 425/542 |
| 2014/0366327 | A1 | 12/2014 | Huang | | |
| 2015/0158171 | A1 * | 6/2015 | Saunders | B25G 1/102 | 16/430 |

FOREIGN PATENT DOCUMENTS

| | | | |
|---|---|---|---|
| DE | 10164649 | A1 | 8/2003 |
| DE | 202005021195 | U1 | 5/2007 |
| DE | 202006005503 | U1 | 5/2007 |
| DE | 202007003351 | U1 | 7/2007 |
| DE | 102006038636 | A1 | 1/2008 |
| DE | 202006015466 | U1 | 2/2008 |
| DE | 102006044506 | A1 | 4/2008 |
| DE | 102005055981 | B4 | 10/2008 |
| DE | 102006037688 | B4 | 12/2008 |
| DE | 102007010972 | B4 | 1/2010 |
| EP | 1894681 | B1 | 6/2012 |
| EP | 1923194 | B1 | 5/2013 |
| EP | 1979135 | B1 | 8/2013 |
| EP | 3479968 | A1 | 5/2019 |
| WO | 2007048555 | A1 | 5/2007 |
| WO | 2007079787 | A1 | 7/2007 |
| WO | 2007079979 | A2 | 7/2007 |

* cited by examiner

ERGONOMIC GRIP FOR STRIKING TOOL

RELATED APPLICATIONS

This application is a continuation of U.S. patent application Ser. No. 17/116,376, filed Dec. 20, 2020, titled "ERGONOMIC GRIP FOR STRIKING TOOL," which issued as U.S. Pat. No. 11,660,738 on May 30, 2023, the entire contents of which are hereby incorporated by reference herein.

FIELD OF THE INVENTION

The present application relates to a grip component for a hand tool, and more specifically to a grip component for a striking tool, such as a hammer or hatchet.

DESCRIPTION OF THE RELATED ART

The present application relates to a hand tool used to strike another object, such as a hammer used to drive a nail, or a hatchet used to strike and cut or split wood. Such a hand tool may be used in construction, manufacturing, and many other applications. The hand tool may include a head portion and a handle attached to or integral with the head portion. The head portion may be made of steel and have a strike surface used to deliver an impact to the nail, wood, wedge, substrate or other object. The hand tool may be gripped by the handle, which may be formed from wood, plastic, composite, metal, other materials, or combinations thereof.

SUMMARY

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to an embodiment, a striking hand tool includes a head portion disposed at a first end of the hand tool and a handle attached to or integral with the head portion and extending toward a second and opposite end of the hand tool, the handle comprising a grip component. The grip component extends along a first axis of elongation for the handle, and at any cross sectional plane perpendicularly intersecting the first axis there is a second axis of symmetry for a cross section of the grip component perpendicularly intersecting with the first axis of elongation, and a third axis separating a front half and a rear half of the handle, the third axis perpendicularly intersecting the first axis and the second axis. An external surface of the grip component comprises a front arc half and a rear arc half, the front arc half defined at any cross sectional plane is along the first axis between a frontmost point and side points along the third axis, and the rear arc half defined at any cross sectional plane is between a rearmost point and the side points along the third axis. A first cross sectional area of the grip component defined by the second axis and the third axis is smaller in a first cross sectional plane defined by the second axis and the third axis along the first axis of elongation proximal to the second and opposite end than in a second cross sectional plane defined by the second axis and the third axis along the first axis of elongation proximal to the head portion. A ρ value of the front arc half in the first cross sectional plane is less than approximately 0.45. A measurement from the first axis to the frontmost point in the first cross sectional plane is between 17.5 mm and 19 mm. A ρ value of the front arc half in the second cross sectional plane is less than approximately 0.5. A measurement from the first axis to the frontmost point in the second cross sectional plane is between 18.5 mm and 20 mm.

According to another embodiment, a method of manufacturing a striking hand tool, includes forming a head portion disposed at a first end of the hand tool, forming a handle comprising a grip component; and attaching the handle to the head portion or making the handle integral with the head portion, the handle extending toward a second and opposite end of the hand tool. The grip component extends along a first axis of elongation for the handle, and at any cross sectional plane perpendicularly intersecting the first axis there is a second axis of symmetry for a cross section of the grip component perpendicularly intersecting with the first axis of elongation, and a third axis separating a front half and a rear half of the handle, the third axis perpendicularly intersecting the first axis and the second axis. An external surface of the grip component comprises a front arc half and a rear arc half, the front arc half defined at any cross sectional plane is along the first axis between a frontmost point and side points along the third axis, and the rear arc half defined at any cross sectional plane is between a rearmost point and the side points along the third axis. A first cross sectional area of the grip component defined by the second axis and the third axis is smaller in a first cross sectional plane defined by the second axis and the third axis along the first axis of elongation proximal to the second and opposite end than in a second cross sectional plane defined by the second axis and the third axis along the first axis of elongation proximal to the head portion. A ρ value of the front arc half in the first cross sectional plane is less than approximately 0.45. A measurement from the first axis to the frontmost point in the first cross sectional plane is between 17.5 mm and 19 mm. A ρ value of the front arc half in the second cross sectional plane is less than approximately 0.5. A measurement from the first axis to the frontmost point in the second cross sectional plane is between 18.5 mm and 20 mm.

According to another embodiment, a striking hand tool includes a head portion disposed at a first end of the hand tool and a handle attached to or integral with the head portion and extending toward a second and opposite end of the hand tool. The handle includes a grip component. The grip component comprises an inner portion and an external portion, the inner portion having a durometer measurement of approximately between 60 Shore A and 70 Shore A, and the external portion having a durometer measurement of approximately between 50 Shore A and 65 Shore A, such that a durometer measurement of the grip component as a whole is approximately between 55 Shore A and 70 Shore A.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not necessarily to scale.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
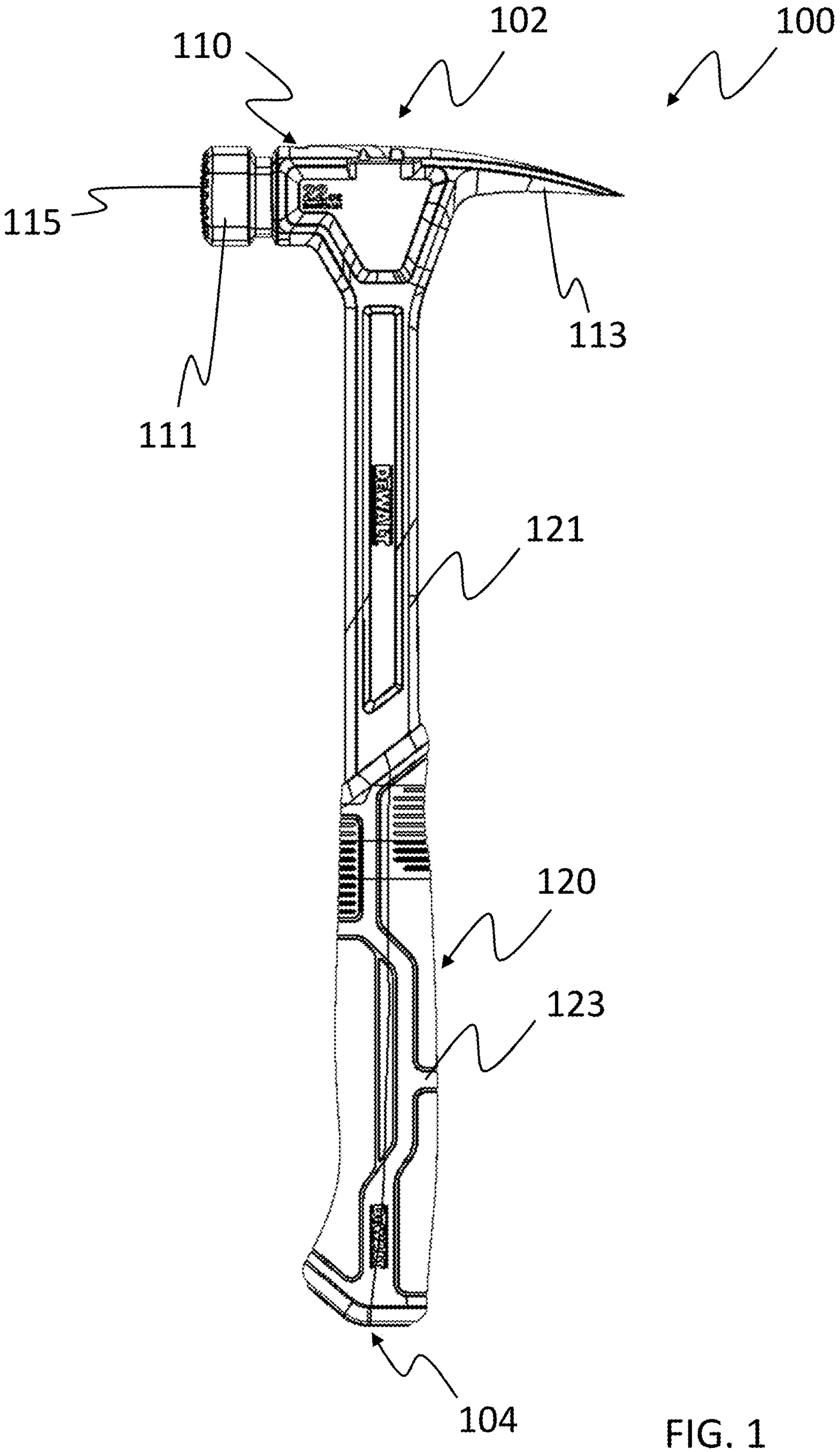
FIG. 1 is a side view of a hand tool, according to an embodiment hereof.

Embodiments herein relate to a grip component for a handle of a hand tool (e.g., a hammer or hatchet), FIG. 1 illustrates an embodiment of a hand tool 100 that is a hammer (e.g., a 22 oz. framing hammer), though other embodiments may involve a hand tool that is a hatchet or other type of striking tool. The hand tool 100 includes a head portion 110 (e.g., a hammer head) and a handle 120. The head portion 110 may be used to strike a nail or other object, and may be located at a first end 102 (e.g., an upper end) of the hand tool 100, while the handle 120 may extend between the head portion 110 and a second, opposite end 104 (e.g., bottom end) of the hand tool In an embodiment, the head portion 110 may include a bell portion 111 at one end of the head portion 110, and include a claw portion 113 (e.g., a rip-type or claw-type) at the opposite end of the head portion 110. The bell portion 111 may have a strike surface 115 for striking the nail or other object. In an embodiment, the strike surface 115 may have a "waffle" pattern machined into or otherwise formed on the strike surface 115, while in other embodiments the strike surface 115 may be generally smooth. The structure and the material for the head portion 110 are described in more detail in U.S. Patent Application Publication No.

2014/0001426, entitled "Hammer," to Lombardi et al., the entire content of which is incorporated herein by reference.

Figure 2:
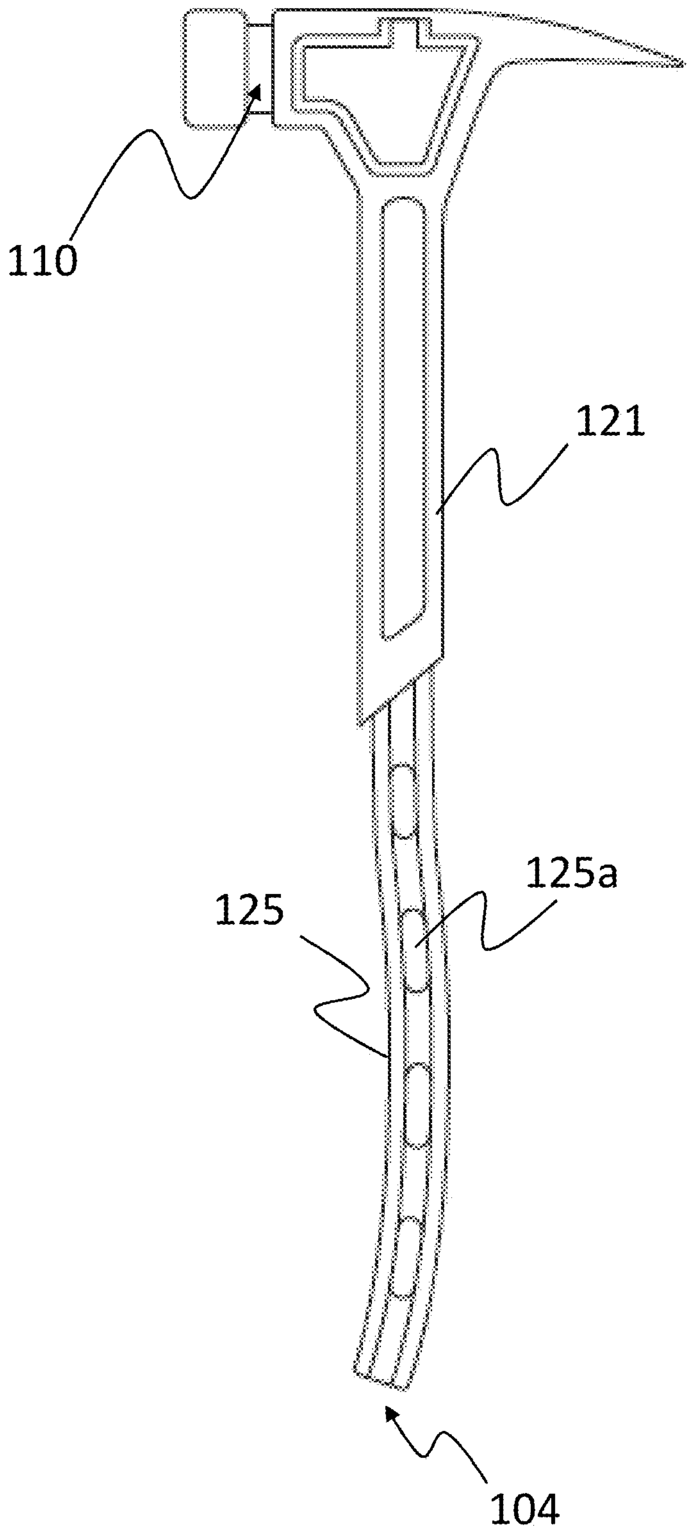
FIG. 2 is a side view of a metal forging including a head, a neck, and handle core for a hand tool, according to an embodiment hereof.

In an embodiment, a neck 121 may extend from the head portion 110 down towards the second end 104 of the hand tool 100. In some embodiments, the neck 121 may be integrally formed with the head portion 110. In an embodiment, the neck 121 may extend to or even into the handle portion 120 to help secure the head portion 110 to the handle portion 120. As described in greater detail below, in an embodiment, a grip component 123 may define a generally outer portion of the handle 120, and may be shaped to be engaged by a hand of a user of the hand tool 100. As seen in FIG. 2, where the grip component 123 is removed from the tool 100, a core 125 of the handle portion 120 may extend from the neck 121 (and in some embodiments may integrally formed with the neck 121, and may too be integrally formed with the head portion 110). While both the neck 121 and the core 125 may be integrally formed with the head portion 110 (e.g., so that the core 125, neck 121 and head portion 110 are part of a single piece), in other embodiments one or more of the neck 121 and the core 125 may be formed separately from the head portion 110 and attached thereto (e.g., via a weld, bond, friction fit, interference fit, adhesive connection, or mechanical connection such as via fasteners). As discussed in greater detail below, in some embodiments, the core 125 may include one or more apertures 125*a* formed within, which may aid in manufacturing, or assist in holding the core 125 to the grip component 123. In various embodiments the grip component 123 may be overmolded onto the core 125, slid onto the core 125, or may be otherwise secured to the neck 121 and or the head portion 110.

In some embodiments the neck 121 or the core 125 may be formed from a steel alloy. In an embodiment, one or more of the neck 121 and the core 125 may be elongated in shape, and may be substantially straight along an axis A (e.g., an axis of handle elongation) extending along a length of the grip component 123 thereof, or may have a curved shape, such as by curving along an axis B extending from a rear of the grip component 123 to a front of the grip component 123 (as such axes are understood with reference to FIG. 3, depicting how the grip component 123 would engage the core 125 in some such embodiments).

Figure 3:
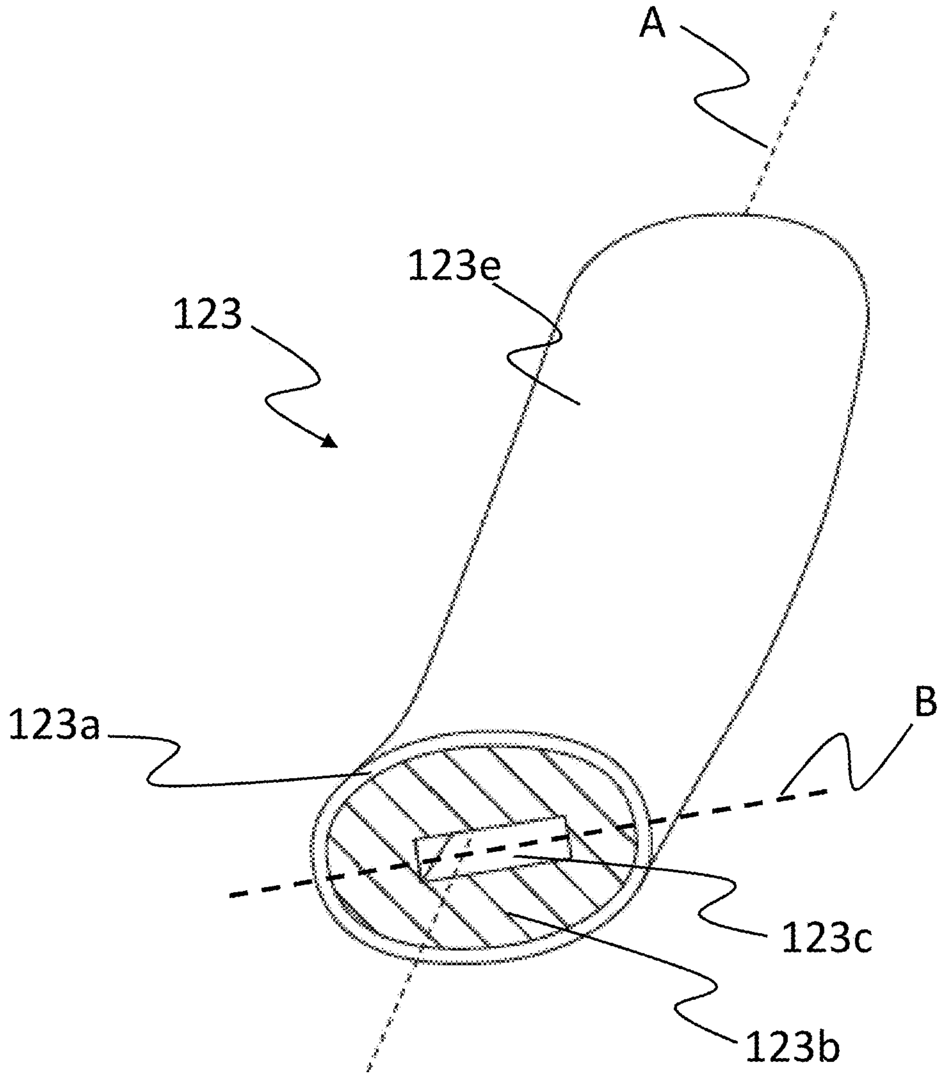
FIG. 3 is a sectioned perspective view of a grip component for a handle of a hand tool, according to an embodiment hereof.

FIG. 3 illustrates a sectioned perspective of an embodiment of the grip component 123 that includes an external portion 123*a* and an inner portion 123*b*. As shown, in an embodiment, the external portion 123*a* forms a shell around the inner portion 123*b*. In an embodiment, the external portion 123*a* may form a first layer that is an external layer (also referred to as outer layer) of the grip component 123, and the inner portion 123*b* may form a second layer that is an inner layer of the grip component 123. In an embodiment, the grip component 123 may be a two-layer grip that includes only the first layer (formed by the external portion 123*a*) and the second layer (formed by the inner portion 123*b*). In such an embodiment, the external portion 123*a* provides an exposed user contact surface (e.g., grip surface) for the grip component 123. In other words, in such an embodiment, an external surface 123*e* of the external portion 123*a* is a surface that contacts a user when the handle 120 is being gripped.

In various embodiments, the first layer formed by the external portion and the second layer formed by the inner portion may be in contact with and chemically or mechanically bonded to each other (e.g., through overmolding, friction fit, adhesive coupling). In an embodiment, the external portion 123*a* forms an entire external surface of the grip component 123, such that none of the material of the inner portion 123*b* is exposed to an external environment at a side of the grip component 123. For instance, the external portion 123*a* may be free of holes or gaps on its external surface, such that the external surface 123*e* is defined entirely by the external portion 123*a*. In other embodiments, the external portion 123*a* may have apertures within that allow portions of the inner portion 123*b* to be exposed, such that the external surface 123*a* is formed by the externally facing surfaces of external portion 123*a* and those portions of internal portion 123*b* exposed through the external portion 123*a*.

The materials of the grip component 123, including one or more of the external portion 123*a* and the inner portion 123*b* may be of any appropriate construction or configuration, including in various embodiments being formed by one or more of a thermoplastic elastomer (TPE), a thermoplastic urethane (TPU) material, and a thermoplastic rubber (TPR) material.

FIG. 3 further illustrates that the inner portion 123*b* may be formed to have a cavity 123*c* for receiving the core 125 and/or portions of the neck 121. In various embodiments, the grip component 123 may be slid onto the core 125, or may be entirely overmolded onto the core 125 such that the cavity 123*c* is at least partially filled by the core 125. In various embodiments, the cavity 123*c* can have a shape that is substantially straight along the axis A of the grip component 123, or may have a curved shape along the axis A. Further, if the grip component 123 is separated from core 125 (e.g., the cavity 123*c* is not yet filled by the core 125 during assembly of the hand tool 100), the cavity 123*c* may have a shape that is substantially the same as at least a portion of the core 125. Having the same shape may allow the core 125 to more easily pass through the cavity 123*c* during the assembly, and may facilitate better contact between the inner portion 123*b* and the core 125 after the grip component 123 is slid thereon.

In other instances, however, when the grip component 123 is configured to be slid onto the core 125, the cavity 123*c* may have a shape that is different than a shape of the core 125 (or, more specifically, different than a shape of a portion of the core 125 onto which the grip component 123 will be slid). In some embodiments, the grip component 123 may flex or deform so that the cavity 123*c* generally assumes the shape of the core 125.

In various embodiment, one or more of the cavity 123*c* and the core 125 may have a cross sectional shape that is regular or irregular, symmetrical or asymmetrical. In an embodiment the cross section of one or more of the cavity 123*c* and the core 125 may be generally rectangular, (e.g., as a rounded rectangle, or an I-beam shape). Regardless, in some embodiments the cross section may be shaped to prevent rotation of the grip component 123 about the core 125. In some embodiments, the apertures 125*a* of the core 125 may facilitate the grip component 123 engaging the core 125 (e.g., if the grip component 123 is overmolded onto the core 125, the material of the grip component 123 may fill in the apertures to prevent the grip component 123 from sliding off of the core 125).

Regardless of the construction of the grip component 123, it may be appreciated that the shape of the external surface 123*e* of the grip component 123 may guide an ergonomic engagement between a user and the tool 100. While such ergonomics may also be impacted by the resilience of the material selections of the grip component 123, a shape of the grip component 123 provides a unique and beneficial aspect of this disclosure.

Figure 4:
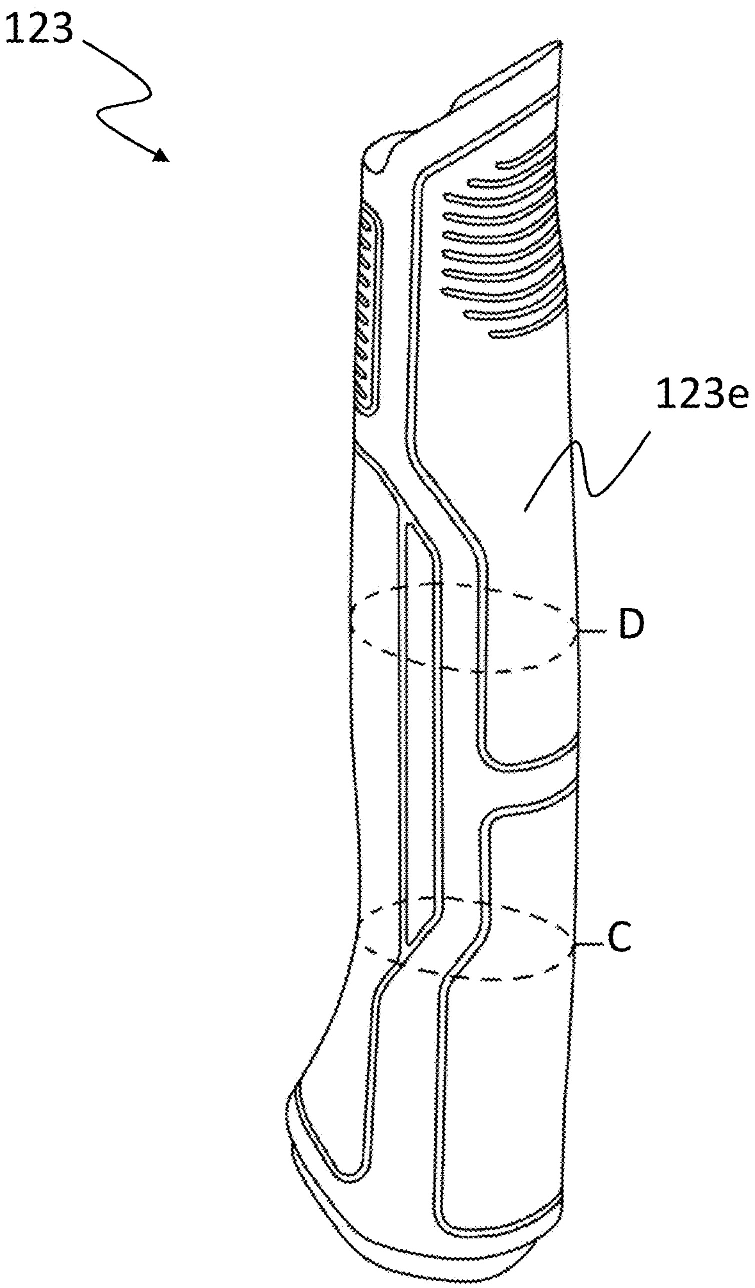
FIG. 4 is an isolated perspective view of the grip component for a handle of a hand tool, according to an embodiment hereof.
Figure 5:
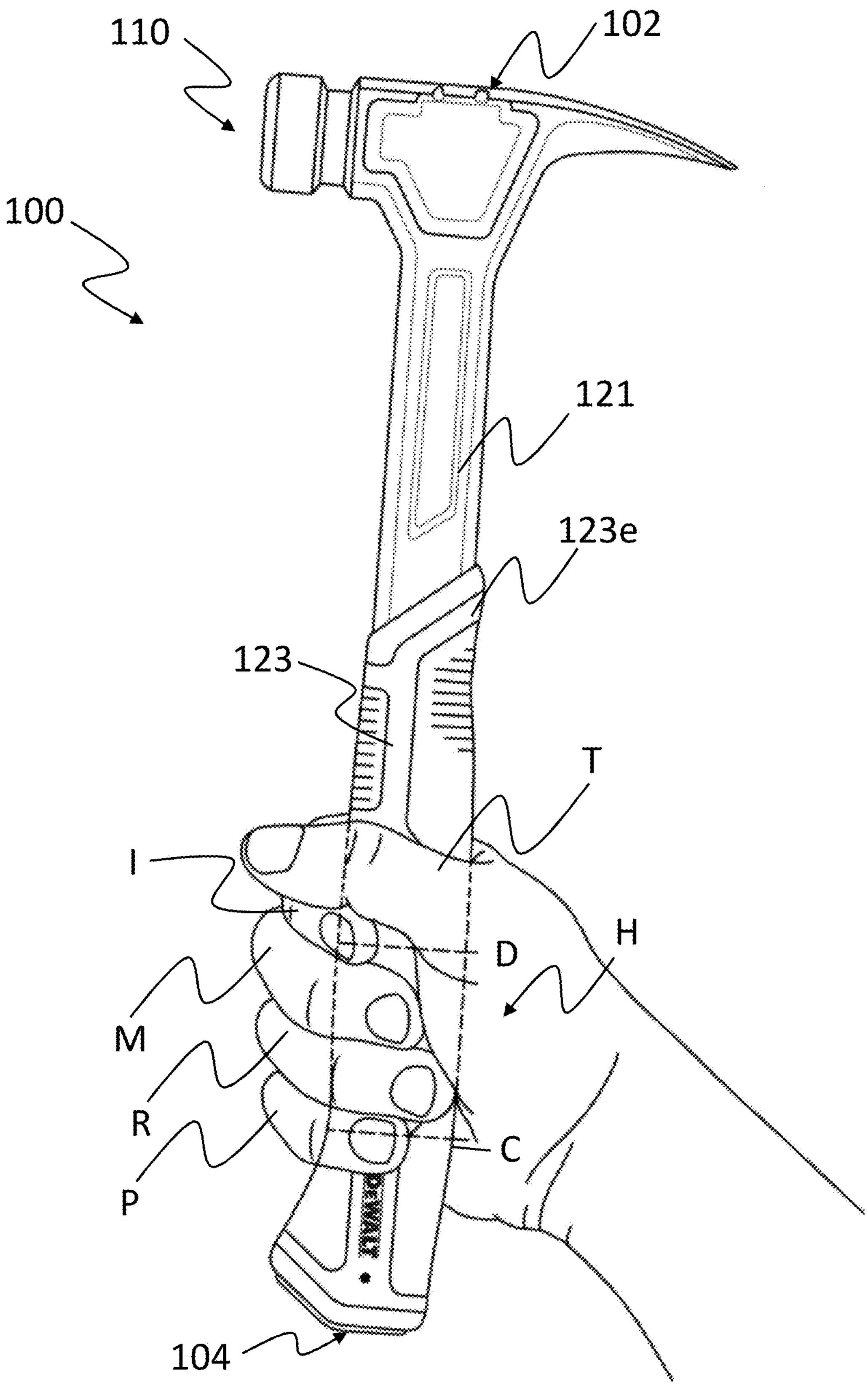
FIG. 5 is a perspective view a hand tool including the grip component as according to FIG. 4, as being engaged by a hand of a user.

As such, FIG. 4 illustrates in isolation the grip component 123, and in particular the external surface 123*e*, while FIG. 5 illustrates the tool 100 including the grip component 123 being engaged by a hand H of a user. It may be appreciated that the grip component 123 may be elongated sufficiently that the hand H of the user may engage multiple regions of the external surface 123*e* at once, and may even be slid along the external surface 123*e* so as to engage different regions of the grip component 123 during different operations of the tool 100. For example, moving the hand H to engage the grip component 123 closer to the neck 121 or the first end 102 may allow for greater precision when using the tool 100 to impact a nail (e.g., when the tool 100 is a hammer) or a previous impact when chopping wood (e.g., when the tool 100 is a hatchet). Similarly, moving the hand H closer to the opposite end 104 may increase the power of an impact.

Accordingly, in some embodiments, ergonomics may be optimized for different regions of the grip component 123, to facilitate improved user engagement during precision holds proximal to the neck 121 or power holds proximal to the opposite end 104. It may be appreciated, however, that based on a length and shape of the grip component 123, a majority of users may initially pick up the tool 100 by engaging their hand around an intermediate grip position, such as that shown in FIG. 5. Accordingly, it may be appreciated that the ergonomics of a grip component 123 may be designed with such a grip position in mind, as is discussed in greater detail below. Regardless, as hand size varies from user to user, a grip component 123 may be designed based on an average hand size across a wide number of users, optimizing the ergonomic feel of the grip component 123 at positions where larger than average hands and smaller than average hands generally agree on ergonomic comfort.

With reference to FIG. 4 and FIG. 5, the ergonomics of the grip may be understood with reference to plane C and plane D, wherein the plane C is generally located proximal to where a pinkie P of the hand H would engage the grip component 123, while the plane D is generally proximal to where the middle finger M and index finger I typically would engage the grip component 123. It may be appreciated that for many users, the primary engagement between the hand H and the grip component 123 may be through the pinkie P, ring finger R, and middle finger M, while the index finger I and the thumb T typically provide support. Regardless, in some embodiments, the plane C may be located approximately 50 millimeters (e.g., approximately 2 inches) above the end 104 (i.e., approximately 50 millimeters from the end 104 towards the end 102), while the plane D may be located approximately 100 millimeters (e.g., approximately 4 inches) above the end 104 (i.e., approximately 100 millimeters from the end 104 towards the end 102). In an embodiment where the grip component 123 is shaped so that the external surface flanges outward (e.g., to prevent the tool 100 from inadvertently sliding out of the users grip), it may be appreciated that the plane C may be located generally where the external surface 123*e* begins to flare away from the axis A. In various embodiments, by being approximately a certain distance from the end 104, it may be understood that that the plane may be plus or minus up to 25% of the distances from the distances from the end 104 noted in the embodiments above.

Figure 6A:
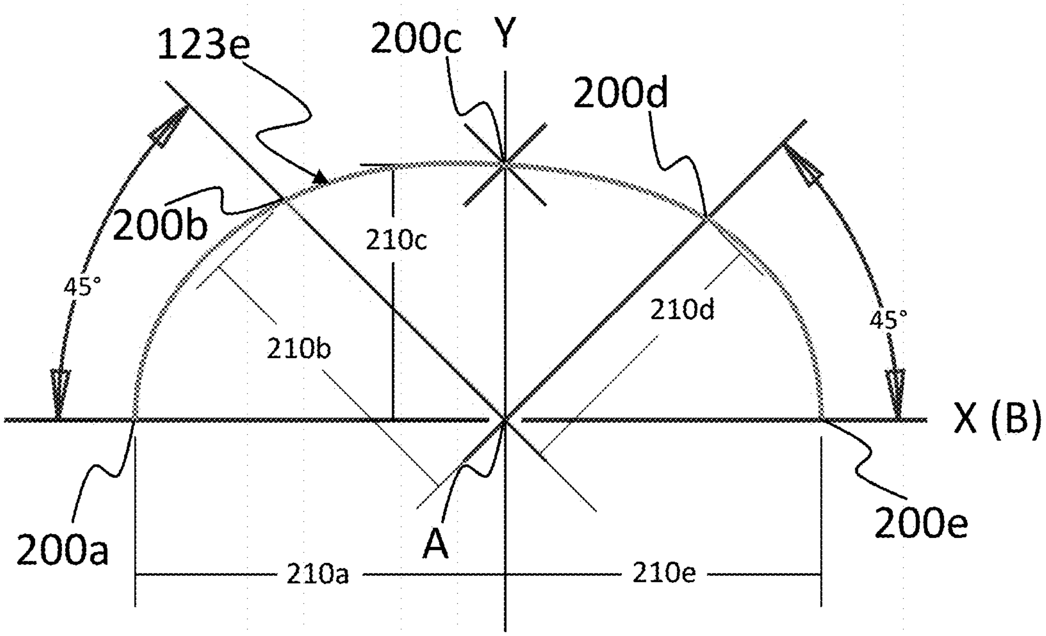
FIG. 6A illustrates a bisected cross-sectional view of the grip component of FIGS. 4 and 5, at a first region thereof.
Figure 6B:
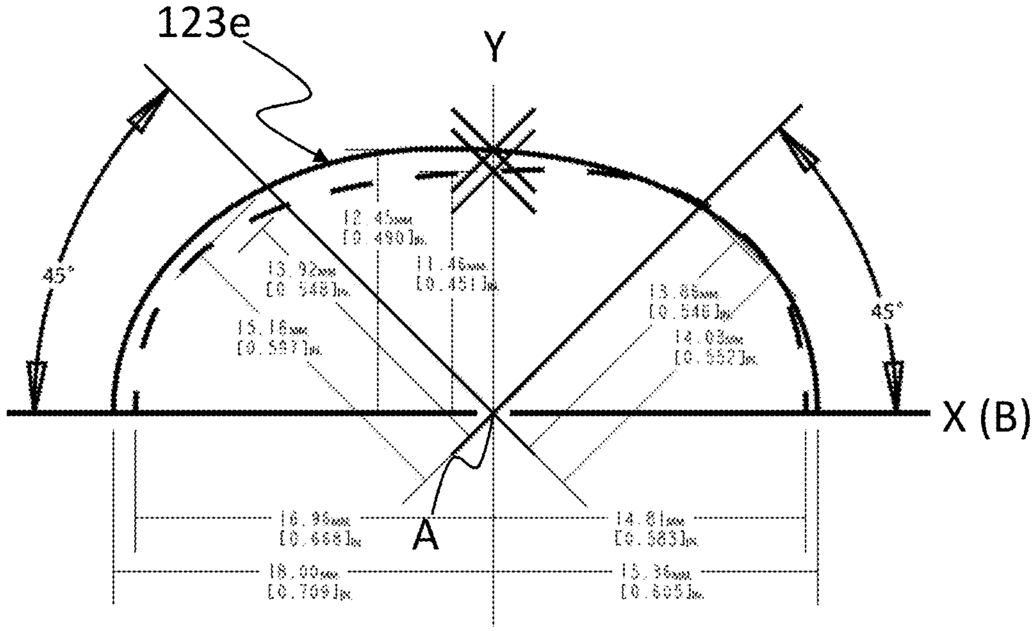
FIG. 6B illustrates an embodiment of the cross-sectional view of FIG. 6A with an embodiment of similar view of a conventional grip component overlaid for comparison.
Figure 7A:
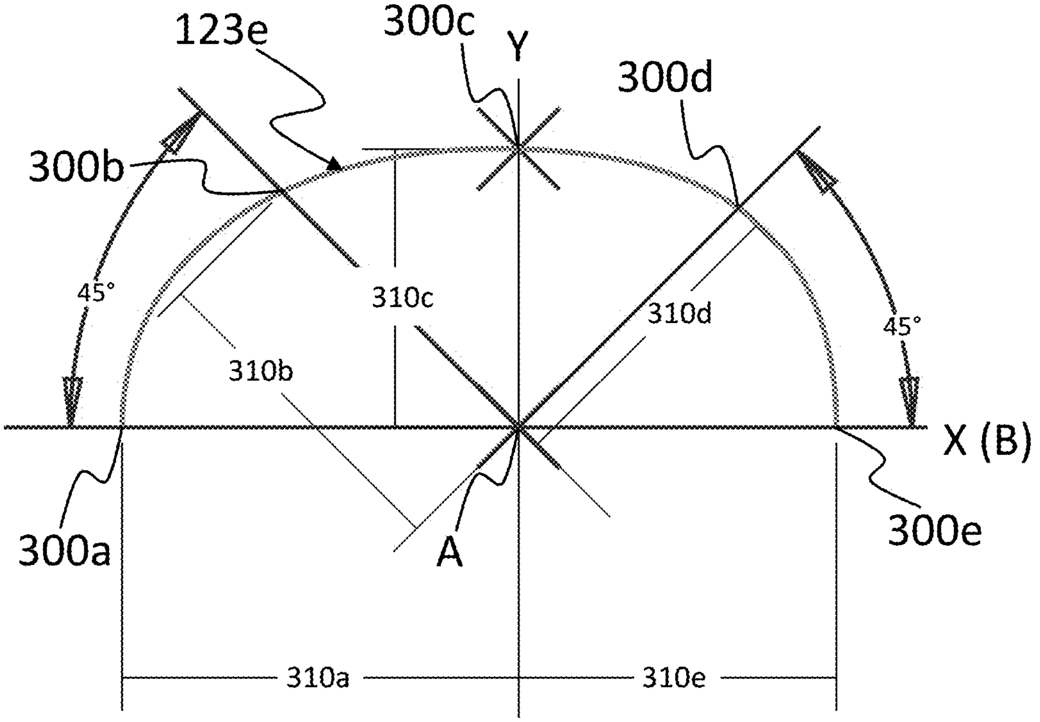
FIG. 7A illustrates a bisected cross-sectional view of the grip component of FIGS. 4 and 5, at a second region thereof
Figure 7B:
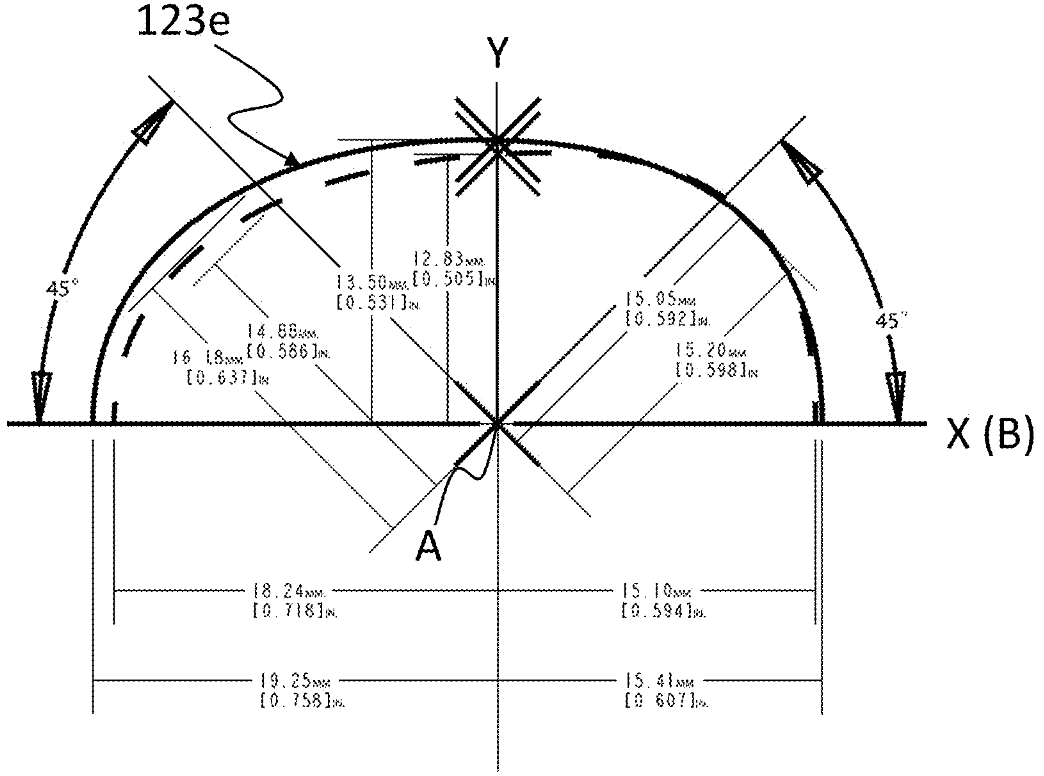
FIG. 7B illustrates an embodiment of the cross-sectional view of FIG. 7 with an embodiment of similar view of a conventional grip component overlaid for comparison.

It may be appreciated that in some embodiments, a cross sectional area of the grip component 123 at the plane C may be smaller than a cross sectional area of the grip component at the plane D, as the pinkie P may commonly curl closer to the palm of the hand H around the grip component 123 than the middle finger M as the fingers are curled together. As such, and as may be appreciated from the discussion in greater detail below, in an embodiment a cross sectional area of the grip component 123 at the plane C may be approximately 674.4 $mm^2$, while in an embodiment a cross sectional area of the grip component 123 at the plane D may be approximately 766.8 $mm^2$, The ergonomics of the grip component 123 at the plane C may be understood further with reference to FIGS. 6A and 6B. As shown in FIG. 6A (and illustrated with exemplary measurements in FIG. 6B, as overlaying those of a conventional grip component shown in broken lines), the external surface 123*e* of the grip component 123 may be understood from measurements taken from a center of the grip component 123, which may be symmetrical over an axis X (which may be parallel to or collinear with the axis B. The axis X may be perpendicular to an axis Y, the intersection of which may generally be understood as a center of the grip component 123, and may coincide with a center of the core 125 located thereat, and may both be perpendicular to the axis A defined above. As such, the axis A, the axis X, and the axis Y may be orthogonal axes. Similarly, the ergonomics of the grip component 123 at the plane D may be understood further with reference to FIGS. 7A and 7B, reflecting the same axes as those of FIGS. 6A and 6B. Similarly, FIG. 7B illustrates the view of FIG. 7A, however with exemplary measurements, and overlaying those of the conventional grip component shown in broken lines.

Returning to FIGS. 6A and 6B, illustrating the ergonomics of the grip component 123 at the plane C, one may appreciate the complex curved shape of the external surface 123*e* as being defined by points relative to the axis A. For example, with the left hand of FIGS. 6A and 6B showing a front of the grip component 123 more proximal to the bell portion 115 than the claw portion 113 for example, a frontmost point 200*a* of the external surface 123*e* at the plane C may be measurement 210*a* from the axis A. A front angle point 200*b* of the external surface 123 at the plane C may be measurement 210*b* from the axis A, and may be located 45 degrees from the axis X as extending from the axis A towards the frontmost point 200*a* in the plane C. A side point 200*c* may be located at the intersection of the external surface 123*e* and the Y axis, and may be measurement 210*c* from the axis A. A rear angle point 200*d* may be measurement 210*d* from the axis A, and may be located 45 degrees from axis X as extending from the axis A away from the frontmost point 200*a* in the plane C. Finally, a rearmost point 200*e* may be measurement 210*e* away from the axis A in the plane C, along the axis X. As shown in FIG. 6B, in some embodiments, the measurement 210*a* may be approximately 18 mm, the measurement 210*b* may be approximately 15.2 mm, the measurement 210*c* may be approximately 12.5 mm, the measurement 210*d* may be approximately 13.9 mm, and the measurement 210*e* may be approximately 15.4 mm Another way for one to understand the curves forming the ergonomic shape of the external surface 123*e* may be through the intrinsic dimensions and shapes of those curves as arc segments defined along the external surface 123*e*. For example, a front arc quadrant may be understood as being generally formed between the frontmost point 200*a* and the side point 200*c*, while a rear arc quadrant may be understood as formed between the side point 200*c* and the rearmost point 200*e*. It may be appreciated that in some embodiments, the arcs quadrants may terminate slightly before or slightly after the side point 200*c* (e.g., where the overall curve between the frontmost point 200*a* and the rearmost point 200*e* is formed by a combination of additional arc segments). According to an embodiment, an arc length between the frontmost point 200*a* and the side point 200*c* at the plane C may be approximately 22.2 mm, while in an embodiment, an arc length between the side point 200*c* and the rearmost point 200*e* at the plane C may be approximately 24.6 mm. It may be appreciated that arc quadrants may be defined between the axis X, the axis Y (or an axis parallel to and adjacent to the axis Y), and the curve of the external surface therebetween. Accordingly, a front arc quadrant may be defined by these axes and the curve between the frontmost point 200*a* and the side point 200*c*, while a rear arc quadrant may be defined by the aforementioned axes and the curve between the side point 200*c* and the rearmost point 200*e*. In an embodiment, an area of the front arc quadrant may be approximately 153.7 $mm^2$ while an area of the rear arc quadrant may be approximately 186.4 $mm^2$.

It may be appreciated that the mathematical ratio ρ (Rho) defines the eccentricity of a conic section, where ρ is the ratio of the distance of the peak of the rounded corner to the sharp corners defined by two points along the curve. In particular a ρ of 0.5 (within manufacturing tolerance) would be understood as generally parabolic in shape. A ρ of less than 0.5 would be generally elliptical in shape, while a ρ of greater than 0.5 would be generally hyperbolic in shape. In an embodiment, a curve defined between the side point 200*c* and a mirror side point 200*c* opposite the axis X, defining a front arc half including the frontmost point 200*a*, at the plane C, may have a ρ value of approximately 0.425. In an embodiment, a curve defined between the side point 200*c* and the mirror side point 200*c* opposite the axis X, defining a rear arc half including the rearmost point 200*e*, at the plane C, may have a ρ value of approximately 0.475. It may be appreciated that when not bisected by the axis X, the arc lengths of the arc quadrants discussed above may be doubled, such that the front arc half defined between the side point 200*c* and the mirror side point 200*c* opposite the axis X, including the frontmost point 200*a*, at the plane C, may have a combined arc length of approximately 44.4 mm, while the rear arc half defined between the side point 200*c* and the mirror side point 200*c* opposite the axis X, including the rearmost most point 200*e*, at the plane C, may have a combined arc length of approximately 49.2 mm.

For purposes of comparison, with regard to a conventional grip surface such as is shown in broken lines in FIG. 6B, a corresponding front arc quadrant measured at a plane C of a conventional grip surface between a frontmost point and a side point similar to frontmost point 200*a* and side point 200*c* may be approximately 25.3 mm, while in an embodiment, an arc length between the side point and a rearmost point similar to the rearmost point 200*e* at the corresponding plane C may be approximately 16.6 mm. Additionally, a conventional front arc quadrant, such as that shown of the example in broken lines, may have an area of approximately 185.4 $mm^2$ while an area of a corresponding rear arc quadrant at the plane C may be approximately 121.2 $mm^2$. In an embodiment, a curve defined between the side point and a mirror side point opposite the axis X of conventional grip surface, defining a rear arc half including the conventional grip surface's frontmost point at the plane C, may have a ρ value of approximately 0.475. In an embodiment, a curve defined between the side point and the mirror side point opposite the axis X, defining a rear arc half including the rearmost point of the conventional grip surface at the plane C, may have a ρ value of approximately 0.5.

As noted, while the plane C may be proximal to the pinkie P where an average user would commonly grasp the grip surface 123, the plane D may be proximal to the ring finger R and index finger I of the hand H, so as to define the primary engagement of the grip surface 123 therebetween. FIGS. 7A and 7B illustrate the ergonomics of the grip component 123 at the plane D, where one may again appreciate the complex curved shape of the external surface 123*e* as being defined by points relative to the axis A. For example, with the left hand of FIGS. 7A and 7B again showing a front of the grip component 123 more proximal to the bell portion 115 than the claw portion 113 for example, a frontmost point 300*a* of the external surface 123*e* at the plane D may be measurement 310*a* from the axis A. A front angle point 300*b* of the external surface 123 at the plane D may be measurement 310*b* from the axis A, and may be located 45 degrees from the axis X as extending from the axis A towards the frontmost point 300*a* in the plane D. A side point 300*c* may be located at the intersection of the external surface 123*e* and the Y axis, and may be measurement 310*c* from the axis A. A rear angle point 300*d* may be measurement 310*d* from the axis A, and may be located 45 degrees from axis X as extending from the axis A away from the frontmost point 300*a* in the plane D. Finally, a rearmost point 300*e* may be measurement 310*e* away from the axis A in the plane D, along the axis X. As shown in FIG. 7B, in some embodiments, the measurement 310*a* may be approximately 19.3 mm, the measurement 310*b* may be approximately 16.2 mm, the measurement 310*c* may be approximately 13.5 mm, the measurement 310*d* may be approximately 15.1 mm, and the measurement 310*e* may be approximately 15.4 mm Similar to that described above with regard to plane C, a front arc quadrant for the plane D may be understood as being generally formed between the frontmost point 300*a* and the side point 300*c*, while a rear arc quadrant may be understood as formed between the side point 300*c* and the rearmost point 300*e*. It may again be appreciated that in some embodiments, the arcs quadrants may terminate slightly before or slightly after the side point 300*c* (e.g., where the overall curve between the frontmost point 300*a* and the rearmost point 300*e* is formed by a combination of additional arc segments). According to an embodiment, an arc length between the frontmost point 300*a* and the side point 300*c* at the plane D may be approximately 25.4 mm, while in an embodiment, an arc length between the side point 300*c* and the rearmost point 300*e* at the plane D may be approximately 24.3 mm. Arc quadrants may again be defined between the axis X, the axis Y (or an axis parallel to and adjacent to the axis Y), and the curve of the external surface therebetween. Accordingly, a front arc quadrant at the plane D may be defined by these axes and the curve between the frontmost point 300*a* and the side point 300*c*, while a rear arc quadrant may be defined by the aforementioned axes and the curve between the side point 300*c* and the rearmost point 300*e*. In an embodiment, an area of the front arc quadrant at the plane D may be approximately 198.7 $mm^2$ while an area of the rear arc quadrant may be approximately 184.7 $mm^2$.

The eccentricity of the conic sections, ratio ρ at the plane D between the side point 300*c* and a mirror side point 300*c* opposite the axis X, defining a front arc half including the frontmost point 300*a*, may be approximately 0.45. In an embodiment, a curve defined between the side point 300*c* and the mirror side point 300*c* opposite the axis X, defining a rear arc half including the rearmost point 300*e*, at the plane D, may have a ρ value of approximately 0.5. It may be appreciated that when not bisected by the axis X, the arc lengths of the arc quadrants discussed above may be doubled, such that the front arc half defined between the side point 300*c* and the mirror side point 300*c* opposite the axis X, including the frontmost point 300*a*, at the plane D, may have a combined arc length of approximately 50.8 mm, while the rear arc half defined between the side point 300*c* and the mirror side point 300*c* opposite the axis X, including the rearmost most point 300*e*, at the plane D, may have a combined arc length of approximately 48.6 mm.

Again for purposes of comparison, with regard to a conventional grip surface such as is shown in broken lines in FIG. 7B, a corresponding front arc quadrant measured at a plane D of a conventional grip surface between a frontmost point and a side point similar to frontmost point 300*a* and side point 300*c* may be approximately 27.2 mm, while in an embodiment, an arc length between the side point and a rearmost point similar to the rearmost point 300*e* at the corresponding plane D may be approximately 20.7 mm. Additionally, a conventional front arc quadrant, such as that shown of the example in broken lines, may have an area of approximately 217 $mm^2$ while an area of a corresponding rear arc quadrant at the plane D may be approximately 135.6 $mm^2$. In an embodiment, a curve defined between the side point and a mirror side point opposite the axis X of conventional grip surface, defining a front arc half including the conventional grip surface's frontmost point at the plane D, may have a ρ value of approximately 0.5. In an embodiment, a curve defined between the side point and the mirror side point opposite the axis X, defining a rear arc half including the rearmost point of the conventional grip surface at the plane D, may also have a ρ value of approximately 0.5.

While in outward appearance the modifications made between the grip component 123 illustrated in solid line, and conventional grip components such as that overlaid in broken line in FIG. 6B and FIG. 7B may seem relatively insignificant, where millimeters of difference are found in certain measurements, it should be appreciated that prototypes of the grip component 123 were experimentally tested over the conventional grip component illustrated and other conventional grip components, with the grip component 123 being heavily favored for user comfort, providing ergonomic benefits that may otherwise be found in the illustrated conventional grip component, but significantly improving upon them by providing a fuller grip as engaged by at least the pinkie P, middle finger M, and ring finger R to vastly improve user comfort.

It may be understood that the ergonomically improved fuller grip discussed above may be understood in terms of the mathematical measures provided herein, and in ratios defined in view of them. For example, the grip component 123 may be understood as having a cross sectional area that is greater at the plane D than at the plane C (e.g. greater at a region more proximal to head portion 110, where typically engaged by the middle finger M, and lesser at a region more proximal to the bottom end, where typically engaged by the pinkie P). Additionally, a ratio of a measurement between the axis A and the frontmost point 200*a* or 300*a*, as compared to the ρ from the side points 200*c* or 300*c* and including the frontmost point 200*a* or 300*a*, may define a fullness of the grip by representing a more elliptical rather than parabolic or hyperbolic shape.

It may be appreciated that the material selections for the grip component 123 may impact the ergonomic feel of the hand tool 100 in a hand of a user. As noted above, the materials of the grip component 123, including one or more of the external portion 123*a* and the inner portion 123*b* may be of any appropriate construction or configuration, including in various embodiments being formed by one or more of TPE, TPU, and TPR materials. Without regard to the specific material being used, it may be appreciated that the hardness or resilience of the material may provide an overall different user experience when engaging the external surface 123*e*. As an example, when the hand tool 100 is a hammer, hatchet, or other striking tool, having a desired resilience in the grip component 123 may dampen vibration from an impact. Even when simply holding the hand tool 100 in ones hand, a certain amount of resilience, in combination with the ergonomic shape, may give a satisfying feel when squeezed, or when a weight of the hand tool 100 pushes the grip component 123 into the hand of the user even when the hand tool 100 is merely being held steady.

According to an embodiment, a durometer value measured on the grip component 123 as a whole (e.g., including both the external portion 123*a* and the inner portion 123*b*) may be approximately between 55 and 70 Shore A. In an embodiment, the overall durometer measurement of the grip component 123 may be approximately 60 Shore A. According to some embodiments, the hardness measured by a durometer may vary for differing layers of material that form the grip component 123. For example, in an embodiment, the inner portion 123*b* may have an associated durometer measurement of approximately between 60 and 70 Shore A. In an embodiment, the inner portion 123*b* may have an associated durometer measurement of approximately 65 Shore A. In an embodiment, the external portion 123*a* may have a durometer measurement of approximately between 50 and 65 Shore A. In an embodiment, the durometer measurement for the external portion 123*a* may be approximately 57 Shore A. Accordingly, it may be appreciated that in some embodiments the external portion 123*a* may have a softer durometer measurement than the inner portion 123*b*. In an embodiment, both the external portion 123*a* and the internal portion 123*b* may be considered between medium soft and medium hard.

In molding the grip component 123 around the core 125, it may be appreciated that in some embodiments the first shot of an injection molding or overmolding process over the core 125 may be of the inner portion 123*b* having a durometer measurement of between 60 and 70 Shore A. The second shot of the injection molding or overmolding process over the core 125 may then be of the external portion 123*a* having a similar hardness or softer material, such as having a durometer measurement of between 55 and 65 Shore A. In some embodiments, a reverse mold technique may be utilized, where the first shot may be the external portion 123*a*, while the second shot may be the inner portion 123*b*, having similar durometer readings as described above. Regardless, it may be appreciated that having a dual shot grip component 123 with the ergonomic geometry further described herein may provide an enhanced user experience when a user grasps or manipulates a hand tool 100 using such a grip component 123.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A striking hand tool, comprising: a head portion disposed at a first end of the striking hand tool, the head portion configured to deliver striking impacts; and a handle attached to or integral with the head portion and extending toward a second and opposite end of the hand tool, the handle comprising a grip component; wherein the grip component comprises an inner portion and an external portion, the plastic inner portion having a durometer measurement within manufacturing tolerance between 60 Shore A and 70 Shore A, and the plastic external portion having a durometer measurement within manufacturing between 50 Shore A and 65 Shore A, such that a durometer measurement of the grip component as a whole is within manufacturing tolerance between 55 Shore A and 70 Shore A; wherein the handle comprises a metal core that extends within the grip component; wherein the metal core is harder than a durometer measurement of the plastic inner portion which is harder than a durometer measurement of the plastic external portion; wherein the grip component is overmolded onto the metal core, with a first shot of the plastic inner portion and a second shot of the plastic external portion; and wherein the plastic external portion surrounds the plastic internal portion where engaged by a user's hand to as to dampen impacts transmitted from the head portion through the metal core to the user's hand.

2. The striking hand tool of claim 1, wherein the head portion comprises a hammer head.

3. The striking hand tool of claim 2, wherein the hammer head comprises a bell portion.

4. The striking hand tool of claim 2, wherein the head portion comprises a claw portion.

5. The striking hand tool of claim 1, wherein the overall durometer measurement of the grip component as a whole is approximately 60 Shore A.

6. The striking hand tool of claim 1, wherein the durometer measurement of the plastic inner portion is approximately 65 Shore A.

7. The striking hand tool of claim 1, wherein the durometer measurement of the plastic external portion is approximately 57 Shore A.

8. The striking hand tool of claim 1, wherein both the plastic external portion and the plastic internal portion are between medium soft and medium hard.

9. The striking hand tool of claim 1, wherein the metal core is integrally formed with a neck that extends from the grip component to the head portion.

10. The striking tool of claim 9, wherein the neck is integrally formed with the head portion.

11. The striking tool of claim 1, wherein the grip component is reverse molded over the metal core, with a first shot of the plastic external portion and a second shot of the plastic internal portion.

12. The striking tool of claim 1, wherein one or more of the plastic inner portion and the plastic external portion are formed from one or more of TPE, TPU, and TPR materials.

* * * * *